Figure 1:
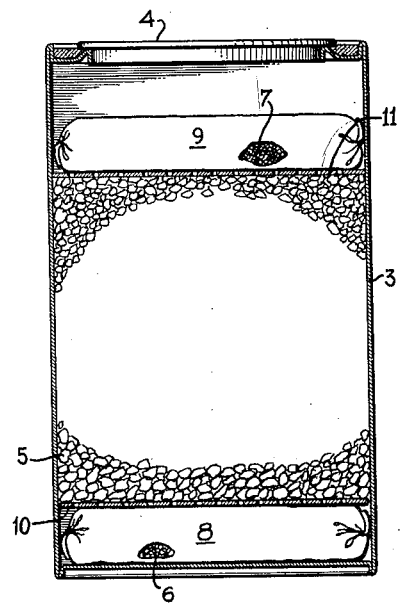

April 10, 1951

W. W. GARY ET AL 2,548,780

PROCESS FOR PRODUCING PELLETED CALCIUM
OXIDE DESICCANT

Filed Sept. 19, 1946

INVENTOR.
WRIGHT W. GARY
ROGER A. LOVETT.
BY
Gerald H. Peterson
ATTORNEY.

UNITED STATES PATENT OFFICE 2,548,780

PROCESS OF PRODUCING PELLETED CALCIUM OXIDE DESICCANT

Wright W. Gary and Roger A. Lovett, Los Angeles, Calif., assignors to Filtrol Corporation, Los Angeles, Calif., a corporation of Delaware Application September 19, 1946, Serial No. 697,958

3 Claims. (23—186)

This invention relates to an improved lime desiccant, the process of producing it and a package of dehydrated food containing such improved desiccant.

Quick lime, that is, calcium oxide, has long been used as a desiccant. Ordinarily quick lime, however, has the undesired property of having fine dust-like particles which too easily become distributed in unwanted places. It also has a high volumetric expansion on pick up of water vapor as it is being used as a desiccant drying agent, which is undesirable for many uses where the space occupied by the desiccant or drying agent should be as small as possible. For example, quick lime may be used as a desiccant in packaging dehydrated foods. Dehydrated foods are packaged in a sealed container after having been dehydrated to a very low moisture content. Quick lime desiccant or drying agent in such a package serves the purpose either of preventing pick-up of moisture by the dehydrated food or of actually further dehydrating or drying such food, or both. It is found, however, that ordinary quick lime used in such packages has the serious disadvantage of a very high volumetric expansion as it picks up water vapor with the result that an uneconomically large part of the volume of the container must be allowed for expansion of the quick lime desiccant which otherwise would be used for food.

In accordance with this invention the discovery has been made that a quick lime desiccant or drying agent can be made having substantially the same desiccant and chemical properties as the ordinary quick lime but differing surprisingly in physical properties, especially in that on picking up water vapor the volumetric expansion is substantially less.

In accordance with one embodiment of this invention calcium hydroxide may be mixed with sufficient water to make is extrudable, then extruded through a die and cut into pellets, the pellets dried to remove free moisture under practical conditions such that they unavoidably pick up some carbon dioxide so that the pellets are composed of both calcium carbonate (which is probably largely on the surface) and calcium hydroxide, the dried pellets heat treated to a critical temperature, as more particularly pointed out below, to produce pellets of quick lime (calcium oxide) having such a physical state that the volumetric expansion on pick-up of water vapors is substantially less than that of ordinary quick lime. Further in accordance with this invention such quick lime pellets may be used in a sealed package containing dehydrated foods with substantially less volume being required for volumetric expansion of such quick lime on pick-up of water vapor.

In preparing the pelleted quick lime, slaked lime is mixed with sufficient water in appropriate equipment to form an extrudable mix so it can be extruded in a pelleting machine. The exact amount of water will vary with different conditions, particularly according to the physical nature of the lime used and to a large extent on the type of equipment used for making the pellets. The rotating die type of extruder, which forces the material through perforations in a cylindrical die and cuts the extruded strands into pellets, has been found most satisfactory, although other types of extruders may be used, especially including the augur mill type with means for cutting extruded strands into pellets. That minimum amount of water which will just permit extrusion will give the best results for pellet production since such amount of water causes the lime to be compressed or compacted to a greater extent during extrusion and also decreases the amount of water required to be evaporated during subsequent treating. The pressure exerted by the extruder in forcing the lime through the die orifices causes a compaction which, in addition to producing uniform hard pellets, also increases the density of the pelleted material.

The moist pellets of calcium hydroxide obtained from the pellet-forming operation must be changed to the calcium oxide form before they are ready for use as a desiccant or drying agent. It has been found that this is best accomplished by heat treating in two stages, i .e., a low temperature drying which removes substantially all the free water followed by a higher temperature treatment to remove combined water and carbon dioxide. The drying step is preferably performed under such conditions that a minimum of carbon dioxide combines with the lime pellets. Ideally, of course, this condition would be satisfied by an atmosphere free of carbon dioxide. As a practical matter, however, removal of water from the lime pellets without combining with carbon dioxide is very uneconomical, and in accordance with this invention the surprising discovery has been made that the pellets can combine with some carbon dioxide and the resulting pellets, which probably have a calcium carbonate coating and a calcium hydroxide core, can be heat treated to give pellets of calcium oxide desiccant which are surprisingly useful as a desiccant especially because they have the unexpected property of a low volumetric expansion on pick-up of water vapor.

Even though the pellets may pick up carbon dioxide which may be removed in accordance with this invention, the treatment of the lime prior to the calcining step to remove combined water and carbon dioxide should be done under such conditions that the carbon dioxide combining with the lime is low. Preferably the carbon dioxide should not be above about 15 per cent by weight of the dried pellets heated for three hours at 500° C.

After drying, the lime pellets combined with some carbon dioxide, as pointed out above, are then treated to remove the combined water and carbon dioxide to change calcium hydroxide and calcium carbonate to calcium oxide at such a low temperature that the resulting calcium oxide product has a low volumetric expansion on pick-up of water vapor. It has been found that this may be done by heating the pellets for from about one to two hours in an oven at a temperature of about 1500° F. Somewhat higher temperatures may be used but it is observed that as the temperature is increased the calcium oxide produced has a higher volumetric expansion and at about 1800° F., for example, the volumetric expansion is considerably higher. Ordinarily temperatures as high as about 1700° F. may be used, but a somewhat lower temperature is preferred. Moreover, the calcium carbonate as well as the calcium hydroxide may be changed to the oxide at temperatures lower than 1500° F., for example, 1400° F. or even as low as 1300° F. provided longer times are used.

Moreover, it has been discovered that the carbon dioxide concentration in the atmosphere above the pellets apparently has a bearing on the rate of $CO_2$ removal from the calcium carbonate and therefore the temperature and time required for such removal. For example, at a temperature of about 1832° F. with the pellets in contact with flue gas containing carbon dioxide it was found that the concentration of carbon dioxide above the pellets was so great that even at this high temperature carbon dioxide could not be completely removed. That the failure to remove $CO_2$ under these conditions is due to the $CO_2$ concentration above the pellets is apparent from the fact that in an experiment where the pellets were heated in an oven at 1832° F. in the absence of flue gas the $CO_2$ was completely removed but the resulting calcium oxide had a high volumetric expansion on pick-up of water vapor almost as high as that for ordinary quick lime. Furthermore, it has been found that as $CO_2$ concentration over the pellets, as they are being heated, is reduced as by a sweeping gas, such as nitrogen, air or steam, the rate of $CO_2$ removal from the calcium carbonate is increased and therefore a lower temperature or shorter time may be used. For example, when using air or steam blown over the heated pellets temperatures as low as 1300° F. may be used. However, when such a sweeping gas is used it is preferable to use a temperature of about 1400° F. so that the effect of a sweeping gas is to shorten the time for removal of combined water and carbon dioxide from the pellets.

Although this invention is not to be limited by any theoretical explanation, the evidence seems to indicate that the production of the undesirable physical form of calcium oxide having a high volumetric expansion on water pick-up is due to the formation of a crystal structure of calcium oxide the rate of formation of which is high at high temperatures. Accordingly, as pointed out above, the higher temperatures must be avoided in removing combined water and carbon dioxide from the pellets in changing them to calcium oxide, to avoid production of a calcium oxide having a high volumetric expansion on pick-up of water vapor. Furthermore, the combined water is removed at a considerably lower temperature than the combined carbon dioxide, and therefore the removal of the carbon dioxide is the principal problem in changing the pellets to calcium oxide. The removal of the combined carbon dioxide is found to be a function of temperature, time of heating and concentration of carbon dioxide in the zone of reaction over the lime pellets. In accordance with this invention the temperature which may be used must be high enough to remove the carbon dioxide and yet sufficiently low to prevent the formation of the undesired calcium oxide form which has a high volumetric expansion on water pick-up. For this purpose it has been found that a temperature of about 1500° F. is desirable and that lower temperatures may be used provided time is allowed for removal of the combined carbon dioxide or means are provided for reducing the concentration of the carbon dioxide, or both. Also, temperatures as high as about 1800° F. may be used. If high temperatures are used, care should be taken, however, to not heat treat the pellets too long at too high a temperature as such a combination may result in too great a CaO crystal growth producing a material having an undesirably high volumetric expansion. In other words, it has been discovered in accordance with this invention that from such lime pellets containing both calcium hydroxide and calcium carbonate a calcium oxide can be produced having the surprising property of a low volumetric expansion on water pick-up by heating such pellets to an elevated temperature below about 1800° F. and above about 1300° F. and correlating the temperature, time of heating and concentration of carbon dioxide over the lime pellets to change them to calcium oxide having a low volumetric expansion on water vapor pick-up.

The lime pellets made in accordance with this invention have the surprising property of having a low volumetric expansion or pick-up of water vapor. Ordinary quick lime on picking up about 30% by weight of water vapor expands in volume about 250%; that is, a volume of 100 cc. for example, will expand to a volume of 350 cc., whereas the lime pellets made in accordance with this invention have a much lower volumetric expansion of less than about 100%, and, in preferred form, of only about 50% on picking up about 30% by weight of water vapor. This property of low volumetric expansion is highly desirable for a desiccant where the volume available for expansion is at a premium. This is especially so, for example, in packaging dehydrated foods in sealed containers where the desiccant and dehydrated food are placed in a container. Ordinary quick lime when used as a desiccant in such a package of food requires a large volume for expansion as it picks up water vapor, whereas the lime desiccant made in accordance with this invention requires a materially smaller space for expansion.

The quick lime pellets made in accordance with this invention are surprisingly hard, uniform and non-dusting, and even on picking up water vapor during use as a desiccant retain their shape with substantially no or very little breakdown into smaller particles. These properties make the quick lime pellets highly useful as a desiccant because they can stand handling, cause little dusting of the quick lime and are therefore relatively clean even during use as a desiccant while picking up water vapor, especially as compared with a powder or granules which pulverize readily.

It is also a surprising property of the quick lime pellets of this invention that in addition to the properties pointed out above there is substantially no loss of capacity to pick up water vapor over the ordinary powder or granular form of quick lime. This is believed to be surprising because it could not be predicted that the quick lime pellets of this invention would have a satisfactory capacity to pick up water vapor.

It has further been discovered that, if the pellets in accordance with this invention are handled and dried, prior to the heating step for changing them to the oxide, under such conditions that either no carbon dioxide has been picked up by the pellets or the carbon dioxide picked up is sufficiently small as to not undesirably lower the water vapor pick up capacity of the resulting product, the calcium hydroxide of the pellets may be changed to the oxide of the form having a low volumetric expansion by heating to a temperature high enough to change calcium hydroxide to the oxide. This is preferably effected at 500° to 600° C. (930° F.–1110° F.) in about 3 hours. Lower temperatures may be used with longer times but not much below about 400° C. (750° F.) will be found practicable. Higher temperatures may be used but the temperature must not be above that temperature at which the undesirable physical form of calcium oxide having a high volumetric expansion is produced. Accordingly, as pointed out above, the temperature should be below about 1800° F. In accordance with this modification of the process of this invention the carbon dioxide is substantially excluded principally in the drying step by performing the drying in suitable apparatus which excludes $CO_2$. The pellets thus produced also have the surprising and unexpected desirable properties which make them highly useful as a desiccant.

It has also been discovered that the quick lime pellets as described above can be used to make a package of dehydrated food in a sealed container with such quick lime pellets as the desiccant or drying agent. Since the quick lime of this invention expands only a fraction by volume of the expansion of the ordinary quick lime, a saving can be made in space required for expansion of the desiccant as it picks up water vapor. Thus it is possible by using the pelleted quick lime desiccant of this invention to pack a much larger quantity of dehydrated food in a container of the same volume. For example, potatoes dehydrated to a moisture content of 6½ to 7% may be packed in a five gallon can with enough ordinary quick lime desiccant to further dehydrate the potatoes down to a moisture content of about 2%. This requires about two pounds of the ordinary quick lime desiccant which occupies about 15% of the volume of the container. Allowing for an expansion of 250% there must be a free space of about 37.5%, for expansion of the drying agent without compression of the food, which leaves only about 47.5% of the volume of the container for the food. Using the pelleted quick lime of this invention, however, the space which must be allowed for expansion is substantially less and therefore the quantity of food in the container can be correspondingly greater. For example, with a lime desiccant product of this invention having an expansion of less than about 100% the space allowed for expansion would be less than the volume of the desiccant used. Assuming an expansion of 100% the desiccant would require 19.4% of the volume, the space allowed for expansion 19.4% and the food 61.2%, an increase of 29% over the 47.5% of the container volume for the material expanding 250%. For a material made in accordance with this invention expanding only 60% by volume, in the same container the desiccant would require 21% of the volume, the space for expansion 12.6% and the food 66.4%, which is an increase of 40% over the 47.5% for the food using the 250% expanding material in the same container and for the same drying or desiccation. Accordingly, it is readily apparent that a package of dehydrated food or other material requiring drying or desiccation using the quick lime material of this invention has surprising and unexpected properties.

Figure 2:
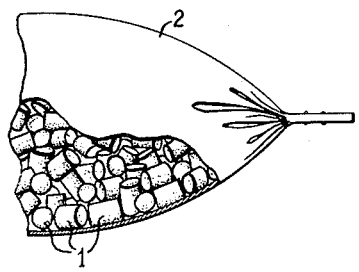

Such a package of dehydrated food is illustrated in the drawing. Figure 1 shows a hermetically sealed container 3 having a cover 4. The dehydrated food such as potatoes is shown in 5. Separated from the dehydrated food by perforated elements 10 and 11 are bags 8 and 9 containing the pelleted lime desiccant of this invention, shown at 6 and 7. Elements 10 and 11 are preferably made of an absorbing material, such as blotting paper, for example, and may be omitted entirely. Such a bag of lime desiccant is shown in more detail in Figure 2 where 2 indicates the bag or other suitable container and 1 the lime desiccant pellets.

The following examples further illustrate the invention:

EXAMPLE 1

A sample of ordinary high grade quick lime (substantially pure calcium oxide) in large lumps was ground to a fine mesh (passing 4 or 5 mesh with major portion smaller than 10 mesh) was carefully dried by heating to 500° C. for three hours. A 50 cc. sample weighing 54.4 grams was exposed to room atmosphere and allowed to pick up water vapor. When the sample picked up water vapor, it was weighed and its volume was measured to determine the increase in volume with weight of water vapor picked up. As the sample had increased in weight to 71.0 grams by picking up water vapor, the volume had increased to 176 cc. This is a weight increase of 30.5% and a volume increase or expansion of 126 cc., or 252%.

The following specified apparatus and procedure was used for testing capacity to pick up water vapor:

*Equipment and reagents*

1. 250 mm. desiccator provided with a sample support made of ¼″ hardware cloth or similar material (to replace the regular desiccator plate).
2. A saturated solution of pure sodium bromide prepared by shaking water with an excess of crystals (110 grams anhydrous salt of 100 grams water) over night on a shaking machine. 500 ml. of this solution with excess crystals is placed in the bottom of the desiccator.
3. Coffee mill or food chopper.
4. Two ounce tin ointment boxes, 6 cm. in diameter, 2 cm. in height, or the equivalent.
5. Suitable temperature control at 1° C.

Procedure

1. Grind not less than one pound of the carefully sampled lime through the fine disc of the food chopper as quickly as possible to avoid moisture adsorption. Reject about one quarter pound of the first portion of the ground material. Transfer the remainder to a closed container and mix it thoroughly.

2. Weigh accurately (0.005 gram) 1.9 to 2.0 grams of the ground sample into a sample container and spread it in a uniform layer over the bottom.

3. Place the sample container in the desiccator using one desiccator for not more than six samples.

4. Weigh the dish and sample after 48 hours and calculate the percentage of water absorbed by the lime from the increase in weight. This procedure tests the water vapor pick-up capacity for a time of 48 hours and about 51% relative humidity at 80° F. A good quick lime desiccant when so tested should have a capacity of 28.5% by weight or more in 48 hours. A sample of the material of this Example 1 so tested over NaBr solution was found to have a water vapor pick up of 31.4%.

EXAMPLE 2

A sample of hydrated lime (substantially pure calcium hydroxide) was extruded after mixing with sufficient water, about 38% based on the hydrated lime, to form pellets $\frac{3}{16}$″ in length and diameter. These pellets were dried to remove most of the free water in a commercial drier under such conditions that they combined with some carbon dioxide as they were being dried, even though efforts were made to exclude as much $CO_2$ as possible. These pellets after further drying for three hours at 500° C. had a $CO_2$ content of 2.56% by weight. In order to remove the combined carbon dioxide and combined water, the pellets were heated in an oven for two hours at 1500° F. which reduced the $CO_2$ content to 0.56%. The pellets retained their shape, did not break down, were hard and uniform and in addition had a very satisfactory water vapor pick up capacity. The water vapor pick up capacity over NaBr solution as per Example 1 was found to be 31.4%. A 50 cc. sample of these pellets weighing 35.0 grams was exposed to room atmosphere and allowed to pick up water vapor. When these pellets, made in accordance with this invention, had increased in weight to 46.9 grams, a weight increase of 34%, the volume had increased to 80 cc., a volume increase of only 60%.

Two other samples similarly prepared in accordance with this invention but having a $CO_2$ content of about 10% before heat treatment at high temperature and a $CO_2$ content of 0.30 and 0.24% after being heated for two hours at 1500° F., each had a water vapor pick up capacity over NaBr solution tested as per Example 1, of 31.7%, and a volumetric expansion of only 49% and 48% respectively for a weight increase on water pick up of 30%. Moreover, in each case the pellets retained their shape, did not break down, and were hard and uniform.

EXAMPLE 3

Another sample of hydrated lime as in Example 2 was formed into pellets, except that the pellets were formed and dried in an oven under such conditions that they picked up substantially no carbon dioxide. These pellets were heated to 500° C. for three hours to remove combined water to change them to calcium oxide. The resulting pellets were uniform and hard and did not break down as they were heated to drive off the combined water. A 50 cc. sample of these pellets weighing 35.4 grams was exposed to room atmosphere and allowed to pick up water vapor. When they had increased in weight to 47.2 grams, a weight increase of 33%, the volume had increased to 72 cc., a volume increase of only 44%. The water vapor pick up capacity tested as per Example 1 was 31.4%.

EXAMPLE 4

Another sample of a commercial hydrated lime was treated as in Example 3, except that the dried pellets were heated to 1700° F. for three hours (instead of 500° C.—932° F.). A 50 cc. sample of these pellets weighing 32.8 grams was exposed to room atmosphere and allowed to pick up water vapor. When the weight had increased to 45.2 grams, a weight increase of 37.8%, the volume increased to 79 cc., a volume increase of only 58%. The water vapor pick up capacity tested as per Example 1 was 32.9%.

EXAMPLE 5

A quantity of hydrated lime was extruded into pellets, and dried, as in Example 2, so that the $CO_2$ content was about 10%. These pellets were heat treated for two hours at 1500° F., which removed all but a trace of $CO_2$. At a weight increase of 30% on water vapor pick up, the volume increase was 60%. The water vapor pick up over a saturated solution of NaBr, as in Example 1, was 31.7%.

A sample of the dried pellets obtained as described above and containing about 10% $CO_2$ was heat treated at 1000° C. (1832° F.) for two hours. The resulting pellets were satisfactory in hardness and uniformity and the water vapor pick up capacity over NaBr solution was raised slightly to 31.9%. However, the volumetric expansion was found to have increased to 104% due to heat treatment at 1832° F. as compared with 60% for 1500° F. This result seems to indicate that at 1832° F. the rate growth of the crystalline form of CaO is sufficiently high to begin to produce a product having a relatively high volumetric expansion on water vapor pick up.

EXAMPLE 6

Two samples of lime pellets prepared as in Example 5, sample A being heat treated at 1500° F. for two hours and having a $CO_2$ content of 0.3%, a water vapor pick up capacity of 31.4% and a volumetric expansion on water vapor pick up of 30% by weight of only 48% and sample B being heat treated at 1832° F. for two hours and having a $CO_2$ content of 0.1%, a water vapor capacity of 31.9% and a volumetric expansion for a 30% weight increase of 125%, were examined by X-ray analysis. This analysis indicated that both samples consisted of CaO with no other detectable phases, but that the two samples differed in effective particle size. Sample A had the smaller particle size, of less than about 2 microns whereas sample B had the larger particle size of around something less than 5 microns. Sample A exhibited a noticeable "cry" on rubbing between the fingers, such as is frequently associated with a fibrous or skeletal structure. It is thought that heating probably first produces skeletal CaO crystals which on longer or hotter heating grow and become more equidimensional and it seems likely that a high volumetric expansion on water pick up may be a consequence of this kind of growth.

EXAMPLE 7

Two samples of the dried pellets, containing about 10% $CO_2$, from Example 5, were heated at 1500° F. and 1400° F. respectively and $CO_2$ content was observed with time. At 1500° F. it was found that at least 15 minutes at 1500° F. was required to reduce the $CO_2$ content to about 1% and that the reduction to less than about 0.3% required about 30 minutes. At 1400° F. it required about 65 minutes to reduce the $CO_2$ content to about 1% and about 85 minutes to reduce it to below 0.3%. Accordingly at 1500° F., the time of heating should preferably be at least about three-quarters of an hour and at 1400° F. preferably at least about two hours.

Although for the purpose of this invention, as pointed out above, it is preferred to use hydrated lime (calcium hydroxide), quick lime may be slaked to the hydrated form, although this usually will involve the problem of dissipation of excess heat of slaking. The lime used should be one which is sufficiently pure to give a calcium oxide product capable of picking up a large quantity of water vapor. Usually the water vapor pick up over NaBr as per Example 1 should be 28.5% or more to give a satisfactory desiccant or drying agent. A lime containing some magnesium may be used if the magnesium content is not too high. A calcium lime or one very high in calcium is preferred.

Although particular examples of this invention have been described for the purpose of illustration, it should be understood that various modifications and adaptations thereof may be made without departing from the spirit of the invention as set forth in the appended claims.

We claim:

1. The process of producing a pelleted calcium oxide desiccant which consists in the steps in sequence of mixing hydrated lime with sufficient water to form an extrudable mix, extruding said mix into strands and cutting the strands to form pellets, drying the pellets, and heating the dried pellets at a temperature between 1300 and 1800° F. to change said hydrated lime to the oxide which, by reason of the pressure of said extrusion step and the heating step, have a volumetric expansion below 100% on pick-up of 30% by weight of water vapor.

2. A process according to claim 1 in which the pellets are swept by a gas during said heating at a temperature in the range of 1300 to 1800° F.

3. A process according to claim 1 in which steam is passed over said pellets during said heating at a temperature in the range of 1300 to 1800° F.

WRIGHT W. GARY.
ROGER A. LOVETT.

REFERENCES CITED

The following references are of record in the file of this patent:

UNITED STATES PATENTS

| Number | Name | Date |
|---|---|---|
| 543,452 | Pierce | July 23, 1895 |
| 599,792 | Pierce | Mar. 1, 1898 |
| 803,904 | Jones | Nov. 7, 1905 |
| 1,222,656 | Moyer | Apr. 17, 1917 |
| 1,318,922 | Rhodes | Oct. 14, 1919 |
| 1,377,401 | Crow et al. | May 10, 1921 |
| 1,381,106 | Charlton | June 14, 1921 |
| 1,532,831 | Mastin | Apr. 7, 1925 |
| 1,657,272 | Neusbaum | Jan. 24, 1928 |
| 1,866,036 | Hartman et al. | July 5, 1932 |
| 2,127,626 | Block | Aug. 23, 1938 |
| 2,225,627 | Flosdorf | Dec. 24, 1940 |
| 2,305,031 | Rarey et al. | Dec. 15, 1942 |
| 2,334,499 | Millard | Nov. 16, 1943 |

FOREIGN PATENTS

| Number | Country | Date |
|---|---|---|
| 438,676 | Great Britain | Nov. 21, 1935 |

OTHER REFERENCES

"Inorganic and Theoretical Chemistry," by Mellor, vol. 3, pp. 654, 673-674, 682, 685, 1923 ed.; Longmans, Green and Co., N. Y., pub.

N. V. S. Knibbs: "Lime and Magnesium," 1924 ed., pages 48, 119, 293, 294; D. Van Nostrand Co., N. Y. pub.

J. R. Wood's "Tablet Manufacture," 1904 ed., page 127; J. B. Lippincott Co., Philadelphia, pub.